United States Patent [19]

Borzo et al.

[11] Patent Number: 4,898,691

[45] Date of Patent: Feb. 6, 1990

[54] ORGANIC NONLINEAR OPTICAL MEDIA

[75] Inventors: Marie Borzo, Basking Ridge; Dagobert E. Stuetz, Watchung, both of N.J.

[73] Assignee: Hoechst Celanese Corporation, Somerville, N.J.

[21] Appl. No.: 194,478

[22] Filed: May 16, 1988

[51] Int. Cl.$^4$ .............................. F21V 9/04; G02B 5/22
[52] U.S. Cl. ....................................... 252/589; 252/582; 252/600; 428/315.5; 428/430; 428/480; 350/1.1
[58] Field of Search ........................ 252/582, 589, 600

[56] References Cited

U.S. PATENT DOCUMENTS

| | | |
|---|---|---|
| 4,640,800 | 3/1987 | Choe . |
| 4,717,508 | 1/1988 | De Martino .................... 252/583 |
| 4,720,355 | 1/1988 | De Martino .................... 252/582 |
| 4,748,074 | 5/1988 | Pantelis et al. ................ 428/220 |
| 4,759,820 | 7/1988 | Calvert et al. ................. 156/600 |
| 4,814,211 | 3/1989 | Buckley ......................... 428/1 |

OTHER PUBLICATIONS

Meredith, G. R.; Van Dusen, J. G.; Williams, D. J., Macromolecules, 15, 1385, 1982.

Meredith, G. R.; Van Dusen, J. G., Williams, D. J.; In Nonlinear Optical Properties of Organic and Polymeric Materials; Williams, D. J.; Ed.; ACS Symp. Ser. 223, ACS, Washington, D.C., 1983; chapter 5.

Primary Examiner—Teddy S. Gron
Assistant Examiner—Richard Treanor
Attorney, Agent, or Firm—DePauli & O'Brien

[57] ABSTRACT

In one embodiment this invention provides a nonlinear optical medium consisting of a solid solution of components comprising (1) a thermoplastic polymer such as poly(methyl acrylate/butyl acrylate); (2) a first organic compound which exhibits nonlinear optical response such as 4-amino-4'-nitrostilbene; and (3) a second organic compound such as methyl acrylate which complexes with and enhances the nonlinear optical response of the first organic compound.

14 Claims, No Drawings

ORGANIC NONLINEAR OPTICAL MEDIA

CROSS-REFERENCE TO RELATED APPLICATIONS

The subject matter of this patent application is related to that disclosed in patent application S.N. 087,493, filed Aug. 20, 1987; which is incorporated herein by reference.

BACKGROUND OF THE INVENTION

It is known that organic and polymeric materials wit large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, Sept. 1982. Papers presented at the meeting are published in ACS Symposium Series 233, American Chemical Society, Washington, D.C. 1983; incorporated herein by reference.

Of related interest with respect to the present invention is the disclosure of U.S. Pat. No. 4,717,508, which describes optically transparent organic solid solutions which exhibit nonlinear optical response; incorporated herein by reference.

There is continuing research effort to develop new nonlinear optical systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel nonlinear optical media.

It is another object of this invention to provide process embodiments for producing novel nonlinear optical media.

It is another object of this invention to provide a transparent optical medium which is a composite of a microporous inorganic oxide glass and an incorporated organic solid solution containing an organic compound which exhibits nonlinear optical response.

It is a further object of this invention to provide optical devices which contain a novel nonlinear optical element.

Other objects and advantages of the present invention shall become apparent from the accompanying description and examples

DESCRIPTION OF THE INVENTION

One or more objects of the present invention are accomplished by the provision of a nonlinear optical medium consisting of a solid solution of components comprising (1) a thermoplastic polymer; (2) a first organic compound which exhibits nonlinear optical response; and (3) a second organic compound which complexes with and enhances the nonlinear optical response of the first organic compound.

A solid solution exhibits third order nonlinear optical response when its macroscopic molecular configuration is centrosymmetric.

A solid solution exhibits second order nonlinear optical response when its macroscopic molecular configuration is noncentrosymmetric. The noncentrosymmetry can be achieved by an external field-induced orientation of aligned molecules of the first organic compound in the solid solution.

In another embodiment this invention provides a nonlinear optical medium consisting of a solid solution of components comprising (1) a thermoplastic polymer; (2) a first organic compound exhibiting nonlinear optical response which corresponds to the formula:

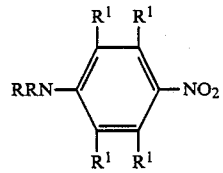

where R is hydrogen or a $C_1$–$C_{20}$ alkyl substituent, and $R^1$ is hydrogen or a $C_1$–$C_4$ alkyl substituent; and (3) a second organic compound which complexes with and enhances the nonlinear optical response of the first organic compound.

In another embodiment this invention provides a nonlinear optical medium consisting of a solid solution of components comprising (1) a thermoplastic polymer; (2) a first organic compound exhibiting nonlinear optical response which corresponds to the formula:

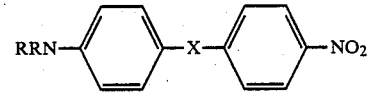

where R is hydrogen or a $C_1$–$C_{20}$ alkyl substituent, and X is a single bond or a vinylene bond; and (3) a second organic compound which complexes with and enhances the nonlinear optical response of the first organic compound.

In an invention nonlinear optical medium, the first organic compound and the second organic compound each is present in a quantity between about 5–25 weight percent based on the weight of solid solution.

It is preferred that the second organic compound is present in a sufficient quantity to associate with all of the first organic compound molecules. Typically, the first and quantities.

A present invention nonlinear optical medium can be in the form of an optically transparent thin film. The thin film can be produced by melt casting an invention solid solution on a substrate. In another method the thin film can be produced by dissolving the solid solution in an organic solvent, coating the resultant liquid medium on a substrate, and removing the solvent to provide a thin film of the reconstituted solid solution. Suitable solvents include acetone, butanol, tetrahydrofuran, dimethylacetamide, ethyl acetate, 1-methyl-2-pyrrolidinone, 1-methyl-2-piperidine, gamma-butyrolactone, cyclohexanone, and the like.

In another embodiment this invention provides a process for producing a nonlinear optical medium which comprises preparing a homogeneous blend of components comprising (1) an organic compound which exhibits nonlinear optical response, and (2) at least one polymerizable vinyl monomer; and subjecting the homogeneous blend to polymerization conditions to produce a solid solution of (a) a host thermoplastic polymer, and (b) a guest organic compound which exhibits nonlinear optical response and is associated with a molecular complexing quantity of residual polymerizable monomer.

The residual polymerizable vinyl monomer in the solid solution is present in a quantity between about 0.8-1.5 moles per mole of guest organic compound.

The olefinic unsaturation of the residual vinyl monomer facilitates the complexing association between the vinyl monomer and the guest organic compound.

Illustrative of polymerizable vinyl monomers are alkyl acrylate, alkyl methacrylate, vinyl halide, acrylonitrile, methacrylonitrile, styrene, acrylamide, methacrylamide, N,N-dialkylacrylamide, N,N-dialkylmethacrylamide, alkyl vinyl ether, and the like. Mixtures of monomers can be utilized to produce copolymers.

Polymerization conditions for preparing the polymers and copolymers are described in prior art such as U.S. Pat. Nos. 3,354,084; 4,115,339; 4,254,249; 4,395,524; 4,717,508; and references cited therein.

In a typical procedure, between about 0.05-1.0 weight percent, based on the monomer weight, of a free radical initiator is incorporated in the homogeneous blend of components, and polymerized at a temperature between about 15°-100° C. for a period of about 1-72 hours. Suitable free radical initiators include ammonium persulfate, dibenzoyl peroxide and azo-bis-isobutyronitrile.

The initial liquid phase homogeneous blend of guest/host components and free radical initiator converts to a thermoplastic solid solution under polymerization conditions. The solid phase can be shaped into thin or bulk matrices by conventional means.

In another embodiment this invention provides a nonlinear optical medium consisting of a composite composition of an inorganic glass monolith with a microporous structure containing an incorporated solid solution of components comprising (1) a thermoplastic polymer; (2) a first organic compound which exhibits nonlinear optical response; and (3) a second organic compound which complexes with and enhances the nonlinear optical response of the first organic compound.

In another embodiment this invention provides a process for producing a nonlinear optical medium which comprises impregnating a microporous inorganic oxide glass monolith with a homogeneous solution of components comprising (1) an organic compound which exhibits nonlinear optical response, and (2) at least one polymerizable vinyl monomer; and subjecting the homogeneous solution to polymerization conditions to produce a solid solution in the microporous glass of (a) a host thermoplastic polymer, and (b) a guest organic compound which exhibits nonlinear optical response and is associated with a molecular complexing quantity of residual vinyl monomer.

The type of polymerizable vinyl monomer and the polymerization conditions employed are as previously described hereinabove.

In a further embodiment this invention provides an optical light switch or light modulator device with a nonlinear optical element consisting of a solid solution of components comprising (1) a thermoplastic polymer; (2) a first organic compound which exhibits nonlinear optical response; and (3) a second organic compound which complexes with and enhances the nonlinear optical response of the first organic compound.

The term "solid solution" as employed herein refers to a homogeneous single phase alloy of guest organic compounds and host polymer components. The guest organic compounds are not detectable as physically discrete crystallites in the polymer matrix. Solid solutions are illustrated in U.S. 4,428,873.

The terms "associated" or "molecular complexing" as employed herein with respect to first and second organic compounds in an invention solid solution refer to a molecular interaction that corresponds to a measured change in the solid state carbon-13 nuclear magnetic resonance (NMR) chemical shift of the nitro-carbon resonance of 2-methyl-4-nitroaniline as a reference standard of at least about 0.5 parts per million (ppm) at 25° due to the presence of the complexing organic molecules.

The molecular interaction is characterized further by a measured increase in the linewidths of the 50 megahertz (MHz) solid state carbon-13 NMR spectrum of the nitro-carbon and amino-carbon resonances of 2-methyl-4-nitroaniline of at least about one ppm at 25° C. due to the presence of the complexing organic molecules.

The term "transparent" as employed herein refers to an optical medium which is transparent or light transmitting with respect to incident fundamental light frequencies and created light frequencies. In a nonlinear optical device, a present invention nonliner optical element is transparent to both the incident and exit light frequencies, and the nonlinear optical element exhibits less than about 15 percent scattering of transmitted incident light.

The term "external field" as employed herein refers to an electric, magnetic or mechanical stress field which is applied to a medium of mobile organic molecules to induce dipolar alignment of the molecules parallel to the field.

Application of a DC electric field produces orientation by torque due to the interaction of the applied electric field and the net molecular dipole moment of the mobile organic molecules. The molecular dipole moment is due to both the permanent dipole moment (i.e., the separation of fixed positive and negative charge) and the induced dipole moment (i.e., the separation of positive and negative charge by the applied field). Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed.

The external field-induced alignment of organic molecules in a present invention nonlinear optical medium can be accomplished by heating the solid solution near or above its softening point, applying an electric field with a pair of positioned electrodes, and cooling the solution to the solid phase while maintaining the externally applied electric field. This method provides a stable molecular orientation in the solid solution.

Thermoplastic Polymer Component

The thermoplastic polymer component of a present invention solid solution can be a homopolymer or a copolymer.

It is essential that the host polymer component has a high level of solvating power with respect to the incorporated first and second organic compounds. Preferably, the thermoplastic polymer is selected to form an optically transparent solid solution with up to about 50 weight percent of the combined weight of guest organic compounds based on the weight of the solid solution.

A typical thermoplastic polymer component has a weight average molecular weight in the range between about 5000 and 200,000.

Illustrative of suitable polymers are polyacrylate, polymethacrylate, polyacrylamide, polymethacrylamide, polyacrylonitrile, polymethacrylonitrile, polyvinyl alkylate, polyvinyl halide, polyurethane, poly(alkyl vinyl ether), and the like. A selected thermoplastic polymer component must be capable of forming an optically transparent solid solution.

A preferred type of thermoplastic polymer is a polyvinyl polymer which contains at least about 70 mole percent of one or more monomers selected from $C_1$–$C_6$ alkyl acrylate, $C_1$–$C_6$ alkyl methacrylate, acrylamide, methacrylamide, N,N-dimethylacrylamide, N,N-dimethylmethacrylamide, acrylonitrile and methacrylonitrile.

NLO Responsive Organic Compound Component

The organic compound component which contributes nonlinear optical response properties to a present invention solid solution optical medium generally is a small molecule having a molecular weight less than about 1000.

The preferred NLO responsive molecule is one which has a charge asymmetric electronic structure consisting of an electron-withdrawing group which is in conjugation with an electron-donating group, and which exhibits a second order nonlinear optical susceptibility $\beta$ of at least about $500 \times 10^{-30}$ esu.

Illustrative of suitable NLO responsive organic compounds are nitroaniline type structures such as 4-nitroaniline, 2-methyl-4-nitroaniline, 1-dimethylamino-4-nitronaphthalene, 2-chloro-4-nitroaniline, N,N-dimethylamino4-nitrobenzene, 4-amino-4'-nitrostilbene, 4-N,N-dimethylamino4'-nitrostilbene, and the like.

Organic compounds which have exceptional nonlinear susceptibility properties are those having structures corresponding to the formula:

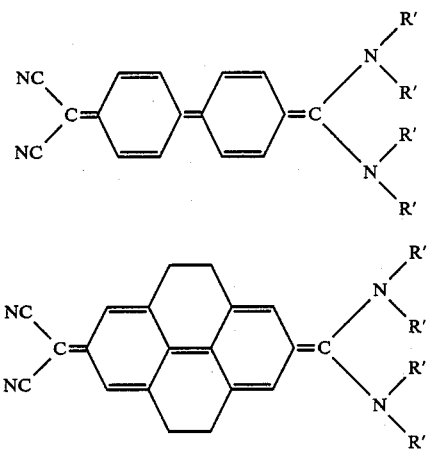

where R' is a substituent selected from hydrogen and ($C_1$–$C_{20}$) alkyl groups. Illustrative of the above formulae are:
13,13-diamino-14,14-dicyanodiphenoquinodimethane.
13,13-di(dimethylamino)-14,14-dicyanodiphenoquinodimethane.
13,13-di(diethylamino)-14,14-dicyanodiphenoquinodimethane.
13,13-di(n-hexadecylamino)-14,14-dicyanodiphenoquinodimethane.
13,13-diamino-14,14-dicyano-4,5,9,10-tetrahydropyrenoquinodimethane.
13,13-di(dimethylamino)-14,14-dicyano-4,5,9,10tetrahydropyrenoquinodimethane.
13,13-di(diethylamino)-14,14-dicyano-4,5,9,10tetrahydropyrenoquinodimethane.
13,13-di(n-hexadecylamino)-14,14-dicyano-4,5,9,10-tetrahydropyrenoquinodimethane.
13,13-ethylenediamino-14,14-dicyanodiphenoquinodimethane.
13,13-ethylenediamino-14,14-dicyano-4,5,9,10-tetrahydropyrenoquinodimethane.

The diphenoquinodimethane compounds are more fully described in U.S. 4,640,800.

Complexing Organic Compound Component

The organic compound component which associates and complexes with the NLO responsive organic compound component in a present invention solid solution optical medium generally is a small molecule having a molecular weight less than about 1000.

The dipolarity of the complexing organic compound and its specific structural configuration provide the associative molecular interaction with the NLO responsive organic compound component.

Suitable complexing organic compounds include $C_1$–$C_6$ alkyl acrylate, $C_1$–$C_6$ alkyl methacrylate, acrylamide, methacrylamide, N,N-dimethylacrylamide, N,N-dimethylmethacrylate, acrylonitrile, methacrylonitrile, alkyl vinyl ether, trioxane, urea, stilbene, aniline, nitroben-zene, 1,4-dimethoxybenzene, and the like.

It is particularly preferred that a present invention solid solution contain a thermoplastic polyvinyl polymer component, and a complexing vinyl organic compound component which is selected to correspond substantially in structure to the primary monomeric unit in the thermoplastic polymer. This type of structural similarity appears to favor compatibility between the complexing organic compound and the thermoplastic polymer, and consequently to favor a desired high content of the NLO responsive organic compound component with which the vinyl organic compound is molecularly associated.

Preparation Of Porous Inorganic Oxide Glass Monoliths

The various methods for the manufacture of porous glass are reviewed in U.S. Pat. No. 4,528,010. The methods include the Vycor (Corning), chemical vapor deposition, white carbon, colloid silica, and silica gel procedures.

One method of producing a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for production of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; 4,588,540; and references cited therein; incorporated herein by reference.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

In another embodiment this invention provides a process for producing a composite composition comprising a homogeneous inorganic oxide glass monolith with a microporous structure containing an organic component which exhibits nonlinear optical response, which comprises (1) hydrolyzing tetraalkoxysilane under acidic or basic pH conditions in a sol-gel reaction medium comprising water and a water-miscible organic solvent component until gellation of the reaction medium is completed; (2) removing the solvent medium to provide a porous glass monolith; (3) impregnating the porous glass monolith with an organic solution which exhibits nonlinear optical response; and (4) sealing the glass monolith outer surfaces.

The term "homogeneous" as employed herein with reference to a porous glass monolith means that the inorganic oxide composition and the microstructure are substantially invariant throughout the monolith.

Embodiments for production of porous inorganic oxide glass monoliths by the sol-gel process are described in U.S. Pat. Nos. 3,640,093; 3,678,144, 3,681,113; 3,811,918; 3,816,163; 3,827,893; 3,941,719; 4,327,065; 4,389,233; 4,397,666; 4,426,216; 4,432,956; 4,472,510; 4,477,580; 4,528,010; 4,574,063; and references cited therein; incorporated herein by reference. Mat. Res. Soc. Symp. Proc., 73, 35 (1986) by Hench et al describes the role of chemical additives in sol-gel processing; incorporated herein by reference.

Illustrative of water-miscible solvents employed in a sol-gel process embodiment are alkanols such as methanol and ethanol; ketones such as acetone and methyl ethyl ketone; esters such as methyl acetate and ethyl formate; ethers such as dioxane and tetrahydrofuran; amides such as dimethylformamide, dimethylacetamide and 1-methyl-2-pyrrolidinone; and the like.

Acidic pH conditions in the sol-gel process can be provided by the addition of mineral acids such as hydrochloric acid; and basic pH conditions can be provided by the addition of bases such as ammonium hydroxide.

Illustrative of tetraalkoxysilanes and other metal and metalloid alkoxides are methoxy and ethoxy derivatives of silicon, lithium, magnesium, titanium, manganese, aluminum, tin, antimony, and the like. Aryloxy derivatives also can be utilized in the sol-gel process.

Porous glass monoliths produced by a sol-gel process embodiment have an advantageous combination of properties, and generally have superior optical properties as compared to porous glass monoliths prepared by other techniques, e.g., by the leaching of a silica-poor phase from a borosilicate glass.

A sol-gel derived porous glass monolith is homogeneous, and the inorganic matrix can be obtained essentially free of inorganic or organic impurities, e.g., less than 2 weight percent of impurities.

A sol-gel derived porous glass monolith typically has a pore structure in which substantially all of the pores have diameters within about a 100 angstrom diameter variation range, e.g., within a range between about 50–150 or 300–400 or 900–1000 angstroms, as determined by sol-gel processing conditions.

A sol-gel derived porous glass monolith can have exceptional optical properties because the inorganic matrix is homogeneous in chemical composition and physical structure. Since there is minimized light scattering, the sol-gel derived porous glass monolith exhibits excellent optical transparency and light transmitting ability.

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a crystalline domain:

$$\Delta\mu = \mu_e - \mu_g = \alpha E + \beta EE + \gamma EEE + ... \quad (1)$$

$$P = P_O + \xi^{(1)}E + \xi^{(2)}EE + \mu^{(3)}EEE + ... \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention nonlinear optical medium typically is optically transparent and exhibits hyperpolarization tensor properties such as third harmonic generation.

These theoretical considerations are elaborated by Garito et al in chapter 1 of the ACS Symposium Series 233 (1983); and by Lipscomb et al in J. Chem., Phys., 75, 1509 (1981), incorporated herein by reference. See also Lalama et al, Phys. Rev., A20, 1179 (1979); and Garito et al, Mol , Cryst. and Liq. Cryst., 106, 219 (1984); incorporated herein by reference.

Nature of NLO Enhancement

The level of response in an invention nonlinear optical medium is enhanced by molecular interactions between the NLO active compound and the complexing organic compound. The interactions may occur via electrostatic or donor-acceptor or Van Der Waals forces.

While the precise mechanism of interaction has not been established, increased mobility of the NLO active molecules is a factor. The molecular interaction is evidenced by changes in chemical shifts of specific nuclear magnetic resonances arising from the NLO active organic compound or from nuclear magnetic resonances which derive from the complexing organic compound.

Nonlinear optical response at a specific molar ratio of NLO active organic compound to thermoplastic polymer matrix in an invention solid solution is enhanced by the presence of the complexing organic compound, as compared to its NLO response in the absence of the complexing organic compound.

The following examples are further illustrative of the present invention. The components and specific ingredients are presented as being typical, and various modifications can be derived in view of the foregoing disclosure within the scope of the invention.

EXAMPLE I

This Example illustrates the preparation of organic solid solution optical media in accordance with the present invention.

A reaction flask is charged with 80 grams of N,N-diethylmethacrylamide, 30 grams of 4-N,N-dimethylamino-4'-nitrostilbene, and 0.1 gram of azo-bis-isobutyronitrile. The flask is purged with argon, then sealed and placed in a 60° C. oil bath.

The resultant product is an optically clear solid solution which exhibits third order nonlinear optical properties After a film sample of the solid solution is subjected to an electric field to form a stable configuration of aligned 4-N,N-dimethylamino-4-'-nitrostilbene molecules, it exhibits enhanced second order nonlinear optical properties.

Solution state carbon-13 nucleus magnetic resonance spectroscopy indicates a 1:1 molecular ratio of N,N-diethylmethacrylamide and 4-N,N-dimethylamino4'-nitrostilbene in the solution. An enhanced D C Kerr effect is observed by the procedures described in Example II, which correlates to a molecular association corresponding to a measured change in the chemical shift of nitor-carbon resonance.

For comparative purposes, 80 grams of poly(N,N-diethylmethacrylamide) and 30 grams of 4-N,N-dimethylamino-4'-nitrostilbene are admixed and heated to a homogeneous melt phase. On cooling, an optically transparent solid solution is formed. The solid solution does not exhibit any evidence of molecularly associated 4,4-N,N-dimethylamino-4'-nitrostilbene, and it exhibits a lower level of nonlinear optical response than the invention solid solution.

EXAMPLE II

This Example illustrates the preparation of an organic/inorganic composite composition in accordance with the present invention.

A. GEL-DERIVED POROUS GLASSES

Tetraethyl orthosilicate (TEOS), ethyl alcohol, water and 1,3,5-trioxane are mixed in a compositional mole ratio 1:4:4:0.85. Hydrofluoric acid (HF) solution is added (maintaining [HF]/[TEOS]=0.04) to the reaction mixture with vigorous stirring at 25° C. After one hour, the solution is poured into plastic containers which then are tightly sealed. The samples are held at 25° C. for 24 hours, during which time gelation occurs. The sealed containers are moved to a convection oven and heated at 60° C. for 24 hours. During the next 48 hours, the container lids are first loosened and then removed.

When the samples show no further weight loss (about 36 hours), the oven temperature is raised and maintained at 100° C. until again no further sample weight loss is observed (about 48 hours). At this point, the "xerogel" samples are transferred to quartz dishes and placed in a muffle furnace. From an initial temperature of 100° C., the furnace temperature is increased to 600° C. over a 24 hour period. The porous glass samples then are annealed from 600° C. to 900° C. for 25 hours at each 100° C. increment.

Analysis of the product glass samples indicates an average surface area of 300 $m^2/g$, and a pore size distribution ranging between 50–60 ° Å. The porosity is determined to be 55% by the Archemedes method using ethanol as the saturating liquid.

B. POLYMER AND SILICA GLASS-POLYMER COMPOSITES CONTAINING 2-METHYL-4-NITROANILINE (MNA)

The composites are prepared by in situ polymerization of methyl methacrylate (MMA) monomer solutions containing 2-methyl-4-nitroaniline (MNA). In the case of the glass-polymer systems, the gel-derived porous glass is imbibed with the monomer solution prior to polymerization. A 5 wt% MNA-silica glass-PMMA composite is prepared in the following manner.

In a 20 cc glass test tube (O.D.=1.5 cm), 0.61 g 2-methyl-nitroaniline and 0.03 g of the free radial initiator, 2,2'-azobis(2-methylproprionitrile), are dissolved in 10.22 g methyl methacrylate. A cylindrical porous glass rod weighing 1.33 g (0.6 cm diameter×6.0 cm length), is fully immersed in the monomer solution containing MNA. When the porous glass is completely infiltrated, the test tube is sealed and the system is heated in an oil bath maintained at 38° C. After 24 hours, the polymerization of MMA results in a transparent composite showing minimum birefringence. The system then is cured at 38° C. over a 48 hour period.

C. SAMPLE FABRICATION

Poly(ethylene glycol) average M.W. 200–600 (Aldrich) is employed as a lubricant in all cutting and polishing operations. For DC Kerr experiments, composites are cut in slab form (i.e., 1.5 cm×2.5 cm×0.3 cm) and the two faces perpendicular to the laser beam pathway are polished.

D. DC KERR MEASUREMENTS

A detailed description of the experimental set-up is published in Proc. SPIE, 682, 153(1986).

A typical experiment is conducted by increasing the voltage across a sample and measuring it with a high voltage probe. At the same time, the resultant change in intensity of the laser beam passing through the sample is measured with a lock-in amplifier. For the Kerr effect, one obtains a linear plot of intensity (I) versus voltage squared ($V^2$). A cell containing $CS_2$ is placed in the optical train as a reference, and a plot of I versus $V^2$ for this reference is also generated. The ratio of the slopes of the unknown to the reference gives the Kerr constant of the unknown material relative to $CS_2$.

E. ELECTRO-OPTICAL DC KERR EFFECTS

The electro-optic effect is the change in the index of refraction of a medium when an electric field is applied across it. The linear change of refractive index with an applied field (i.e., Pockels effect) occurs in noncentrosymmetric media, while the quadratic dependence is called the Kerr effect and occurs in all media.

The birefringence, $\Delta n$, induced in a Kerr composite is $$\Delta n = \lambda B E^2$$

where B is the Kerr constant; $\lambda$ is the wavelength of light; n is the refractive index; and E is the applied electric field.

When a molecule is dissolved in a host medium such as PMMA or silica glass-PMMA, one measures the incremental Kerr constant, $\Delta B$, where $\Delta B = B(\text{solution}) - B(\text{host medium})$. When the molecule is totally free to orient in the applied field, as in solutions, one can define a molar Kerr constant, mK. This constant is essentially the product of the dipole moment squared and the optical anisotropy of the molecule. For an unhindered molecule in solution, the largest contribution to mK is due to molecular orientation resulting from the coupling of the electric field with the permanent and induced dipole moments of the molecule. This is the primary mechanism for the induced birefringence, and reveals the optical anisotropy of the molecule. Weaker contributions also arise from the distortion of the electronic cloud of the molecule in the electric field; however, these are negligible in the DC Kerr effect.

In the case of a solid solution such as MNA in PMMA or in glass-PMMA, the interpretation of mK is more complicated since the molecule is not totally free to move in an electric field. However, the mK value still can be used as a measure of the relative freedom of a solute molecule in a solid medium.

The effective molar Kerr constant for MNA in PMMA is determined to be $1.32 \times 10^{-9}$ esu, while that for MNA in glass-PMMA is estimated to be $1.65 \times 10^{-9}$ esu. For MNA in a dioxane solution, the mK value is found to be $6.85 \times 10^{-9}$ esu. Calculating values of mK(composite)/mK(dioxane solution), one obtains ratios equal to 0.19 and 0.24 for the PMMA and glass-PMMA systems, respectively. In both composites, the freedom of MNA to orient in the electric field is reduced relative to that in solution, although it appears the MNA is slightly more mobile in the glass-polymer host than in PMMA alone.

What is claimed is:

1. A nonlinear optical medium consisting of a solid solution of components comprising (1) a thermoplastic acrylate or methacrylate polymer or copolymer; (2) a first organic compound exhibiting nonlinear optical response which corresponds to the formula:

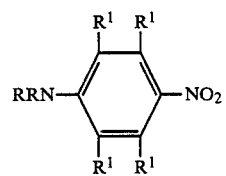

where R is hydrogen or a $C_1$–$C_{20}$ alkyl substituent, and $R^1$ is hydrogen or a $C_1$–$C_4$ alkyl substituent; and (3) a second organic compound which complexes with and enhances the nonlinear optical response of the first organic compound.

2. A nonlinear optical medium in accordance with claim 1 wherein the first organic compound and the second organic compound each is present in a quantity between about 5–25 weight percent based on the weight of solid solution.

3. A nonlinear optical medium in accordance with claim 1 wherein the first and second organic compounds are present in about equimolar quantities.

4. A nonlinear optical medium in accordance with claim 1 wherein the second organic compound is olefinically unsaturated.

5. A nonlinear optical medium in accordance with claim 1 wherein the second organic compound is monomeric acrylate, methacrylate, acrylamide or methacrylamide.

6. A nonlinear optical medium in accordance with claim 1 which is in the form of an optically transparent thin film.

7. A nonlinear optical medium consisting of a solid solution of components comprising (1) a thermoplastic acrylate or methacrylate polymer or copolymer; (2) a first organic compound exhibiting nonlinear optical response which corresponds to the formula:

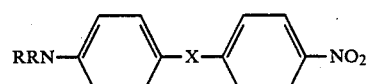

where R is hydrogen or a $C_1$–$C_{20}$ alkyl substituent, and X is a single bond or a vinylene bond; and (3) a second organic compound which complexes with and enhances the nonlinear optical response of the first organic compound.

8. A nonlinear optical medium in accordance with claim 7 wherein the first organic compound and the second organic compound each is present in a quantity between about 5–25 weight percent based on the weight of solid solution.

9. A nonlinear optical medium in accordance with claim 7 wherein the first and second organic compounds are present in about equimolar quantities.

10. A nonlinear optical medium in accordance with claim 7 wherein the second organic compound is olefinically unsaturated.

11. A nonlinear optical medium in accordance with claim 7 wherein the second organic compound is monomeric acrylate, methacrylate, acrylamide or methacrylamide.

12. A nonlinear optical medium in accordance with claim 7 which is in the form of an optically transparent thin film.

13. A nonlinear optical medium consisting of a composite composition of an inorganic glass monolith with a microporous structure containing an incorporated solid solution of components comprising (1) a thermoplastic acrylate or methacrylate polymer or copolymer; (2) a first organic compound exhibiting nonlinear optical response which corresponds to the formula:

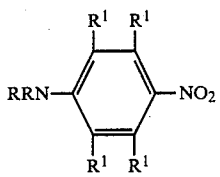

where R is hydrogen or a $C_1$–$C_{20}$ alkyl substituent, and $R^1$ is hydrogen or a $C_1$–$C_4$ alkyl substituent; and (3) a second organic compound which complexes with and enhances the nonlinear optical response of the first organic compound.

14. A nonlinear optical medium consisting of a composite composition of an inorganic glass monolith with a microporous structure containing an incorporated solid solution of components comprising (1) a thermoplastic acrylate or methacrylate polymer or copolymer; (2) a first organic compound exhibiting nonlinear optical response which corresponds to the formula:

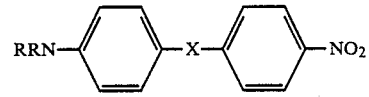

where R is hydrogen or a $C_1$–$C_{20}$ alkyl substituent, and X is a single bond or a vinylene bond; and (3) a second organic compound which complexes with and enhances the nonlinear optical response of the first organic compound.

* * * * *